Dec. 8, 1953    A. W. NOVAK ET AL    2,661,768
INDICATING ORIFICE PLATE FOR THREADED ORIFICE UNION
Filed Oct. 29, 1949
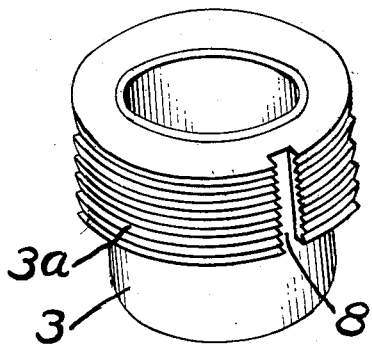
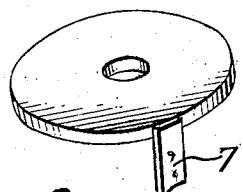
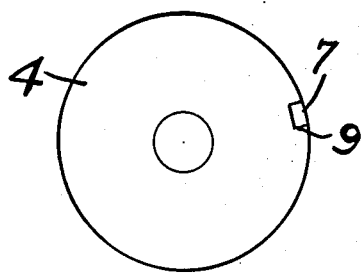
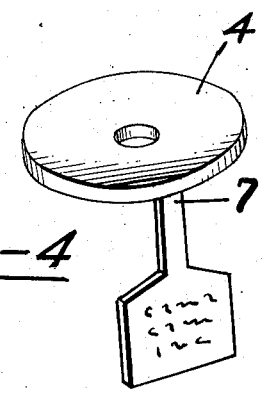
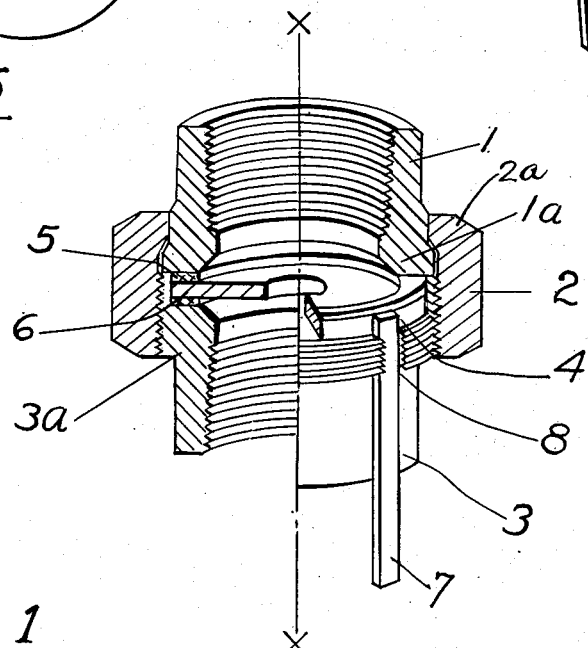
August W. Novak
Roy F. Mildrum        Inventors
By W. O. Heilman    Attorney Patented Dec. 8, 1953

2,661,768

UNITED STATES PATENT OFFICE 2,661,768

INDICATING ORIFICE PLATE FOR THREADED ORIFICE UNION

August W. Novak, Union, and Roy F. Mildrum, Hillside, N. J., assignors to Standard Oil Development Company, a corporation of Delaware Application October 29, 1949, Serial No. 124,434

5 Claims. (Cl. 138—44)

The present invention relates to a union or coupling for conduits provided to receive a flow-restricting plate such as an orifice plate or a blank plate. The invention further relates to such a device in which the restricting plate may be provided with an indicating tab so that the presence of the plate and its nature may be visibly indicated without uncoupling the union.

Although in the past, indicating tabs have been provided for flow-restricting plate members in a conduit system, the use of such devices has been substantially limited to flange type installations, in which the plate member is held between the flanged ends of two conduit elements, and where the peripheral edge of the plate member may be extended without interference with the means for uniting the ends. With a flow-restricting plate employed in a union coupling of the type contemplated by the present invention, the plate being completely enclosed within the coupling, previously it has not been possible to provide any integral indicating means to show the presence of a plate in the coupling, or the size and type of such plate. It is therefore an object of the present invention to provide a coupling device, including a flow-restricting plate member, in which the presence of the plate member, and its type or character may be determined without uncoupling the conduit elements.

The invention and its objects may be more fully understood from the following description when read in conjunction with the accompanying drawings, in which Fig. 1 is an isometric view of the coupling partly in section;

Fig. 2 is an isometric view of the threaded male member of the coupling;

Fig. 3 is an isometric view of one form of flow-restricting plate for the assembly;

Fig. 4 is a similar view of another form of plate member; and

Fig. 5 is a plan view of a third form of the flow-restricting plate.

Referring more specifically to the drawings in which like parts are indicated by the same numerals, the numeral 1 indicates one element of a union type coupling assembly in which the element is provided with an outwardly flanged head 1a rotatably engageable by the inwardly extended flange 2a of a union nut 2, the nut 2 being threaded interiorly to receive the peripherally threaded, outwardly flanged head 3a of the male coupling element 3. Each coupling element 1 and 3 is interiorly threaded to receive the ends of adjoining conduit sections.

In the assembly illustrated by Fig. 1, the numeral 4 designates a flow-restricting plate member insertable between the opposed flanged ends 1a and 3a of the coupling elements 1 and 3, with suitable annular gaskets 5 and 6 disposed between the flanged ends of the coupling elements and the respective opposite surfaces of the plate 4. As shown, the plate 4 is an orifice plate having a central, flow-restricting opening or passageway. Under other circumstances, the plate member may be a solid plate closing the conduit at the coupling.

In order to provide a means whereby the type and character of the flow-restricting plate 4 may be determined without uncoupling the union, the plate tab 7 is joined to the peripheral edge portion of the plate in substantially parallel relation to the center line $x$—$x$ of the coupling assembly. To accommodate the tab, the threaded flange 3a of the element 3 is provided with a recess or slotted portion 8, the depth of this portion being such as to substantially equal the thickness of the tab 7 and accommodate the tab wholly below the depth of the threads on the portion 3a. In the assembly thus illustrated by Figures 1, 2 and 3, the tab 7 is affixed to the outer peripheral edge of the plate member 4, and accordingly the plate member 4 is of a diameter slightly less than the diameter of the threaded flange portion 3a. Where desired, the end of tab 7 may be affixed to one surface of the plate 4 so that the outer surface of the tab lies in a plane coincident with the peripheral edge of the plate. Such construction is illustrated by Fig. 4 and, when so constructed, the plate and tab may have an overall diameter substantially equal to that of the flange portion 3a minus twice the depth of the threads thereon.

Fig. 5 illustrates another way in which the tab 7 may be attached to the orifice plate. In this form, the orifice plate is slotted, as indicated by the numeral 9, to a depth substantially equivalent to the thickness of the tab 7, and the tab is inserted in the plate slot 9, and affixed to the plate in such position, the outer surface of the tab being in the same plane with the peripheral edge of the plate.

In any of the forms shown in Figs. 3, 4 and 5, it may be possible to manufacture the plate and tab as an integral stamped out unit, later bending the tab in such manner as to produce a tab element which is the equivalent of either of the forms illustrated in these figures, and this is within the structural concept of the device.

In operation, the plate member 4 is placed over the end of the threaded flange portion 3a of element 3, with the tab extending through the slotted portion 8 on the portion 3a, and with gaskets 5 and 6 on either side of the plate. The coupling element 1 and union nut 2 are then united in the assembly by threaded engagement of the nut with the threaded portion of flange 3a. When so assembled, the plate tab 7 extends outwardly beyond the union nut 2 in close parallel relation to the element 3, and the conduit element joined thereto, so as to be visible for inspection. By suitably imprinting or stamping the exposed end of the tab, the type and character of the plate member in the assembly may be readily determined by ordinary inspection. Where desired, the exposed end of the tab may be suitably enlarged, as illustrated in Fig. 4, to provide a greater surface for plate-indicating markings. Also, the tab may be colored distinctively to indicate and distinguish any one of several plate types. The assembly and flow-restricting plate element as described, may be employed wherever a flow-restricting element is required in a union joint or coupling.

What is claimed is:

1. A conduit flow-restricting coupling device, comprising a pair of tubular coupling elements, each engageable at one end with one of two adjoining conduit section ends, a plain outwardly flanged head on one element, an internally threaded union nut rotatably carried by said head, an outwardly flanged head on the other element, having a threaded edge engageable by said nut, a recess in said threaded edge of a depth greater than the threads thereon and disposed in substantially right angular relation thereto, a flow-restricting plate member disposed laterally of said coupling between the flanged heads, held in fluid-tight relation therebetween by means of said nut, and an elongated tab joined to the peripheral edge of said member at substantially right angles thereto extending outwardly from said coupling through said recess in substantially parallel relation to the axis of the coupling device and accommodated therein wholly below the depth of the threads on said threaded flange edge.

2. A conduit flow-restricting device according to claim 1, in which the tab is formed integrally with said plate member.

3. A device according to claim 1, in which said tab is joined to the peripheral edge of said plate member at one end and in surface to surface relation with said edge.

4. A device according to claim 1, in which one end edge portion of said tab is joined to one surface of said plate member with one surface of said tab lying substantially within a plane coincident with the peripheral edge of said plate member.

5. A device according to claim 1, including a slotted portion in the peripheral edge of said plate member, extending through said edge in right angular relation thereto, said tab being secured in said slotted portion with one end and one surface respectively thereof lying substantially within planes coincident with one surface and the peripheral edge respectively of said plate member.

AUGUST W. NOVAK.
ROY F. MILDRUM.

References Cited in the file of this patent

UNITED STATES PATENTS

| Number | Name | Date |
| --- | --- | --- |
| 1,731,404 | Wetherill | Oct. 15, 1929 |
| 1,920,524 | Reed | Aug. 1, 1933 |
| 2,455,120 | Hamer | Nov. 30, 1948 |

FOREIGN PATENTS

| Number | Country | Date |
| --- | --- | --- |
| 17,075 | Great Britain | Dec. 4, 1915 |